United States Patent
Szucs

(10) Patent No.: US 12,483,920 B2
(45) Date of Patent: Nov. 25, 2025

(54) TERMINAL DEVICE, INFRASTRUCTURE EQUIPMENT AND METHODS

(71) Applicant: Sony Group Corporation, Tokyo (JP)

(72) Inventor: Paul Szucs, Esslingen (DE)

(73) Assignee: Sony Group Corporation, Tokyo (JP)

( * ) Notice: Subject to any disclaimer, the term of this patent is extended or adjusted under 35 U.S.C. 154(b) by 558 days.

(21) Appl. No.: 17/908,215

(22) PCT Filed: Jan. 15, 2021

(86) PCT No.: PCT/GB2021/050088
§ 371 (c)(1),
(2) Date: Aug. 30, 2022

(87) PCT Pub. No.: WO2021/198633
PCT Pub. Date: Oct. 7, 2021

(65) Prior Publication Data
US 2023/0119696 A1   Apr. 20, 2023

(30) Foreign Application Priority Data
Mar. 30, 2020  (GB) .................................... 2004625

(51) Int. Cl.
*H04W 28/02*   (2009.01)

(52) U.S. Cl.
CPC ... *H04W 28/0205* (2013.01); *H04W 28/0268* (2013.01)

(58) Field of Classification Search
CPC .. H04W 28/0268; H04W 24/02; H04W 24/10
See application file for complete search history.

(56) References Cited

U.S. PATENT DOCUMENTS

| | | | |
|---|---|---|---|
| 2016/0234770 A1 | 8/2016 | Homchaudhuri | |
| 2021/0258818 A1* | 8/2021 | Jung | H04L 41/147 |
| 2022/0386166 A1* | 12/2022 | Sarker | H04L 69/164 |

OTHER PUBLICATIONS

International Search Report and Written Opinion from corresponding International Application No. PCT/GB2021/050088, Apr. 19, 2021, 17 pages.
3rd Generation Partnership Project (3GPP), "Technical Specification Group Services and System Aspects; 5G Media Streaming (5GMS); General description and architecture (Release 16)", 3GPP TS 26.501, V16.3.1, Mar. 2020, 63 pages.
BBC et al., "Add sample percentage to 5GMSA stage 2 Consumption Reporting", 3GPP TSG-SA4 Meeting #108, S4-AH1930, Apr. 6-9, 2020, 3 pages.

(Continued)

*Primary Examiner* — Bo Hui A Zhu
(74) *Attorney, Agent, or Firm* — Tucker Ellis LLP

(57) ABSTRACT

A terminal device comprising: transceiver circuitry configured to communicate with infrastructure equipment; and processing circuitry configured to control the transceiver circuitry to: provide Network Assistance metrics information to the network, the Network Assistance metrics information including: a server identifier that identifies the Network Assistance server; a bitrate recommendation metric that defines the number of bitrate recommendations in a predefined period of time and a boost metric that defines the number of delivery boosts in the predefined period of time.

20 Claims, 5 Drawing Sheets

(56) References Cited

OTHER PUBLICATIONS

3rd Generation Partnership Project (3GPP), "Technical Specification Group Services and System Aspects; System architecture for the 5G System (5GS); Stage 2 (Release 16)"; 3GPP TS 23.501, V16.7.0, Dec. 2020, 450 pages.
3rd Generation Partnership Project (3GPP), "Technical Specification Group Core Network and Terminals; 5G System; Policy and Charging Control signalling flows and QoS parameter mapping, Stage 3 (Release 16)", 3GPP TS 29.513, V16.1.0, Sep. 2019, 94 pages.
Harri Holma et al., "LTE for UMTS OFDMA and SC-FDMA Based Radio Access", John Wiley and Sons, dated 2009, pp. 25-27.
3rd Generation Partnership Project (3GPP), "Technical Specification Group Services and System Aspects; Transparent end-to-end Packet-switched Streaming Service (PSS); Progressive Download and Dynamic Adaptive Streaming over HTTP (3GP-DASH) (Release 16)", 3GPP TS 26.247, V16.4.1, Oct. 2020, 140 pages.
3rd Generation Partnership Project (3GPP), "Technical Specification Group Services and System Aspects; 5G Media Streaming (5GMS); General description and architecture (Release 16)", 3GPP TS 26.501, V16.3.0, Mar. 2020, 63 pages.
3rd Generation Partnership Project (3GPP), "Technical Specification Group Services and System Aspects; System architecture for the 5G System (5GS); Stage 2 (Release 16)"; 3GPP TS 23.501, V16.4.0, Mar. 2020, 430 pages.

\* cited by examiner

TERMINAL DEVICE, INFRASTRUCTURE EQUIPMENT AND METHODS

BACKGROUND

Field of Disclosure

The present disclosure relates to terminal device, infrastructure equipment and methods.

Description of Related Art

The "background" description provided herein is for the purpose of generally presenting the context of the disclosure. Work of the presently named inventor, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

Other types of device, for example supporting high-definition video streaming, may be associated with transmissions of relatively large amounts of data with relatively low latency tolerance. Yet other types of device, for example used for autonomous vehicle communications, may be characterised by data that should be transmitted through a network with very low latency and very high reliability. A single device type might also be associated with different data traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes the so-called "5G Media Services Architecture" (SGMSA). This is described in [1]. The 5GSMA is designed to offer a simpler and more modular design enabling services with different degrees of co-operation between Third-Party content and service providers, broadcasters and the like.

In this architecture Network Assistance (NA) is described. The principle behind Network Assistance is to improve the user experience especially when streaming content. The User Experience is typically improved when one or both of the Quality of Service (QoS) and the Quality of Experience (QoE) is improved. Primarily the User Experience is improved by avoiding player stalls due to the empty audio and/or video (A/V) buffers when streaming the content.

On startup to the session, the User Equipment (UE) may ask the network for a recommendation of the best bitrate to use from amongst those offered by the media content server; for example, 500 kbps, 1 Mbps, 2 Mbps, 5 Mbps, 10 Mbps or the like. The network estimates the throughput of the data based on current load on the network and the current network conditions. The network then informs the UE. This enables the UE to make an informed choice of the bitrate to use rather than either starting with a very high bitrate and risking stalling or starting with a very low quality bitrate and gradually increasing it.

In some instances, during streaming, the reception of the bitstream may be interrupted, for example if reception is lost for a few seconds by passing through a tunnel or the like. This means that the A/V buffer(s) may be depleted. By using the Network Assistance (NA) feature the UE can ask the network for a delivery boost to help it catch up and fill the depleted buffers to maintain the streaming content. If possible, the network will schedule a burst of packets to that UE.

The recommendation component and the boost component are the principles behind NA.

Currently, in [1] there are two alternative mechanisms for provision of NA. The first mechanism is to provide NA at the Radio Access Network (RAN) layer and the second mechanism is to provide NA at the application layer. These two different mechanisms are mutually exclusive, i.e. the UE and the network will utilize only one mechanism for NA in any given streaming session, never both concurrently.

The metrics set out at Clause 4.2.3 are reported as described in Clause 5.5 "Metrics Collection and Reporting" of [1].

Moreover, at Clause 4.2.3 "Service Access Information" a place holder for a table is provided (Table 4.2.3-5 "Parameters for Network Assistance Configuration"). However, the configuration parameters will largely depend on which of the mechanisms is chosen for the provision of NA by the respective service, or for the respective streaming session. In the case of NA provision via signaling at the Radio Access Network (RAN) layer no configuration parameters are necessary. In the case of NA provision via signaling within a protocol at the application layer the configuration parameter to be provided is the NA server address.

It is an aim of the present disclosure to address this issue.

SUMMARY OF THE DISCLOSURE

The present disclosure can help address or mitigate at least some of the issues discussed above as defined in the appended claims.

Specifically, in embodiments, a set of parameters (or information) for NA metrics reporting are selected that are compatible with both delivery of NA at the RAN layer and delivery of NA at the application layer.

Embodiments of the present technique can provide a terminal device comprising: transceiver circuitry configured to communicate with infrastructure equipment; and processing circuitry configured to control the transceiver circuitry to: provide Network Assistance metrics information to the network, the Network Assistance metrics information including: a server identifier that identifies the Network Assistance server; a bitrate recommendation metric that defines the number of bitrate recommendations in a predefined period of time and a boost metric that defines the number of delivery boosts in the predefined period of time.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution (LTE) Wireless Communications System

Figure 1:
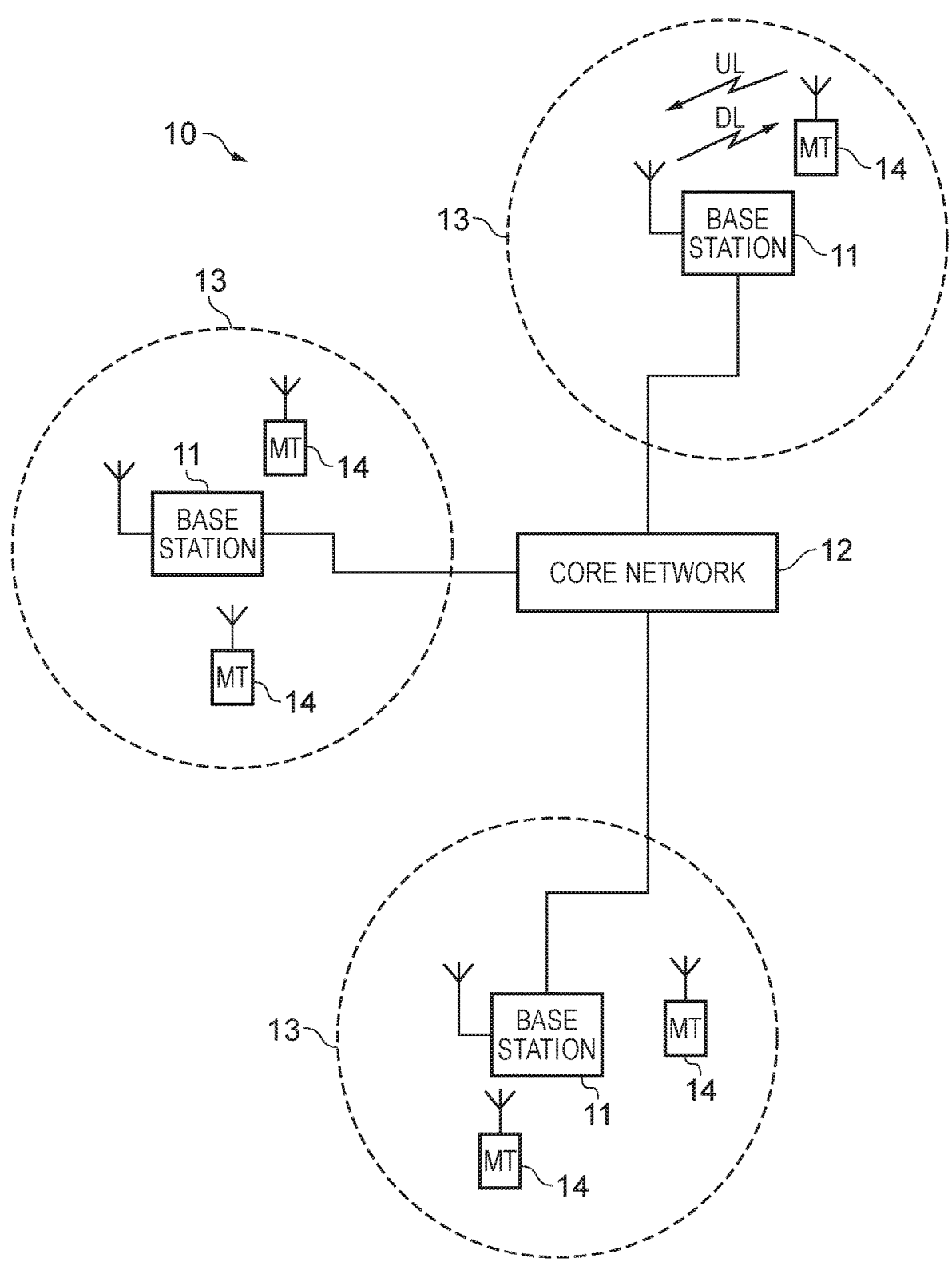
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [3]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink (DL). Data is transmitted from terminal devices 14 to the base stations 11 via a radio uplink (UL). The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

As mentioned above, the embodiments of the present invention can find application with advanced wireless communications systems such as those referred to as 5G or New Radio (NR) Access Technology. The use cases that are considered for NR include:

Enhanced Mobile Broadband (eMBB);
Massive Machine Type Communications (mMTC);
Ultra Reliable & Low Latency Communications (URLLC); and
Enhanced Ultra Reliable & Low Latency Communications (eURLLC).

eMBB services are characterised by high capacity with a requirement to support up to 20 Gb/s. URLLC service requires that a packet at layer 2 is transmitted with a latency that is less than 1 ms or 0.5 ms with reliability of 99.999% to 99.9999%.

The elements of the wireless access network shown in FIG. 1 may be equally applied to a 5G new RAT configuration, except that a change in terminology may be applied as mentioned above.

Figure 2:
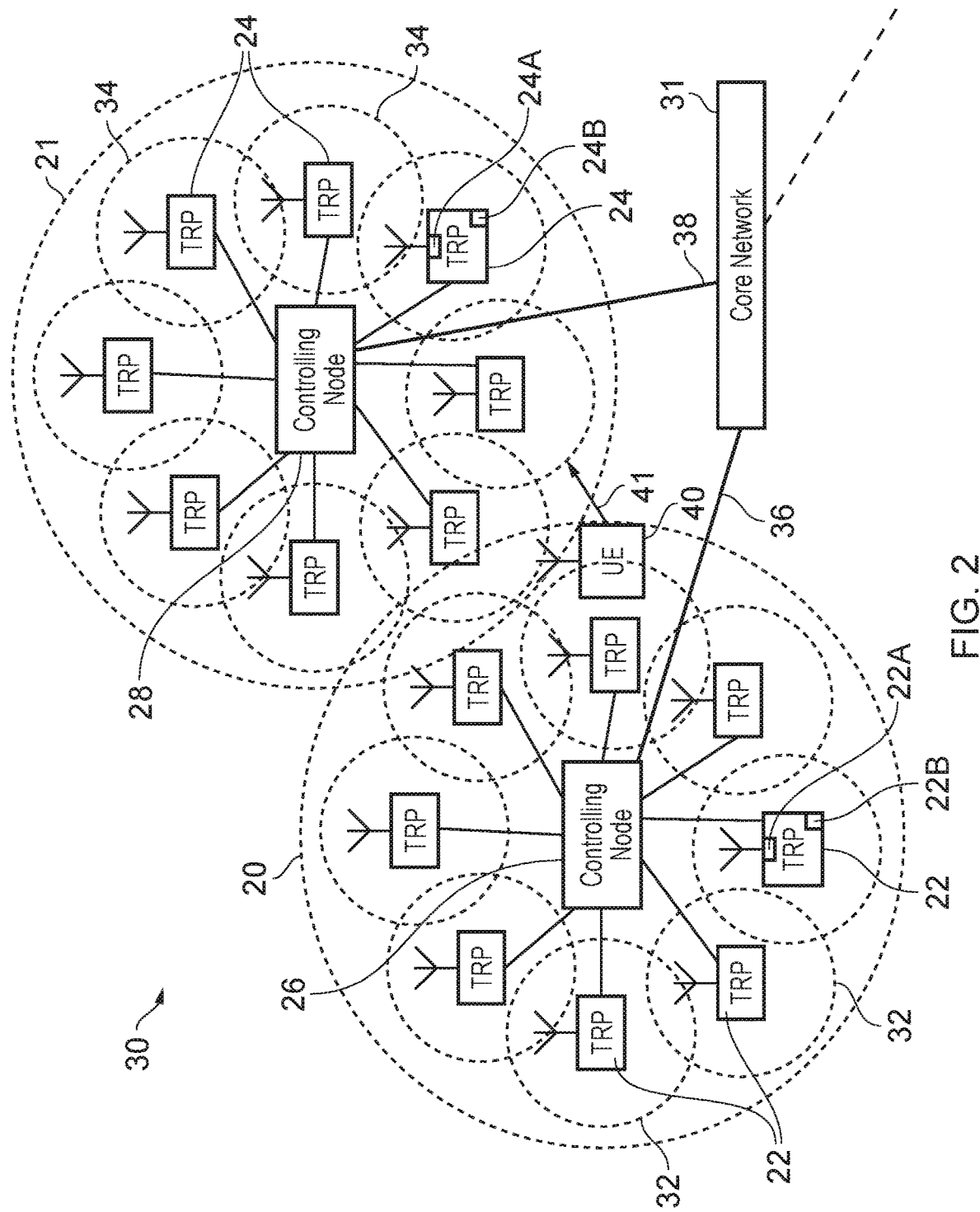
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit, CU) 26, 28 in communication with a core network component 31 over a respective wired or wireless link 36, 38. The respective controlling nodes 26, 28 are also each in communication with a plurality of distributed units (radio access nodes/remote transmission and reception points (TRPs)) 22, 24 in their respective cells. Again, these communications may be over respective wired or wireless links. The distributed units (DUs) 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22a, 24a for transmission and reception of wireless signals and processor circuitry 22b, 24b configured to control the respective distributed units 22, 24.

In terms of broad top-level functionality, the core network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to base stations of FIG. 1, and so these terms (as well as indeed eNodeB, eNB, gNodeB, gNB, etc.) are interchangeable. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 14 is represented in FIG. 2 within the coverage area of the first communication cell 20. This terminal device 14 may thus exchange signaling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios.

The particular distributed unit(s) through which a terminal device is currently connected through to the associated controlling node may be referred to as active distributed units for the terminal device. Thus the active subset of distributed units for a terminal device may comprise one or more than one distributed unit (DU/TRP). The controlling node 26 is responsible for determining which of the distributed units 22 spanning the first communication cell 20 is responsible for radio communications with the terminal device 14 at any given time (i.e. which of the distributed units are currently active distributed units for the terminal device). Typically this will be based on measurements of radio channel conditions between the terminal device 14 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 14. That is to say, in some cases the terminal device may not be aware of which distributed unit is responsible for routing communications between the terminal device 14 and the controlling node 26 of the communication cell 20 in which the terminal device is currently operating, or even if any distributed units 22 are connected to the controlling node 26 and involved in the routing of communications at all. In such cases, as far as the terminal device is concerned, it simply transmits uplink data to the controlling node 26 and receives downlink data from the controlling node 26 and the terminal device has no awareness of the involvement of the distributed units 22, though may be aware of radio configurations transmitted by distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 14 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2.

It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

Figure 3:
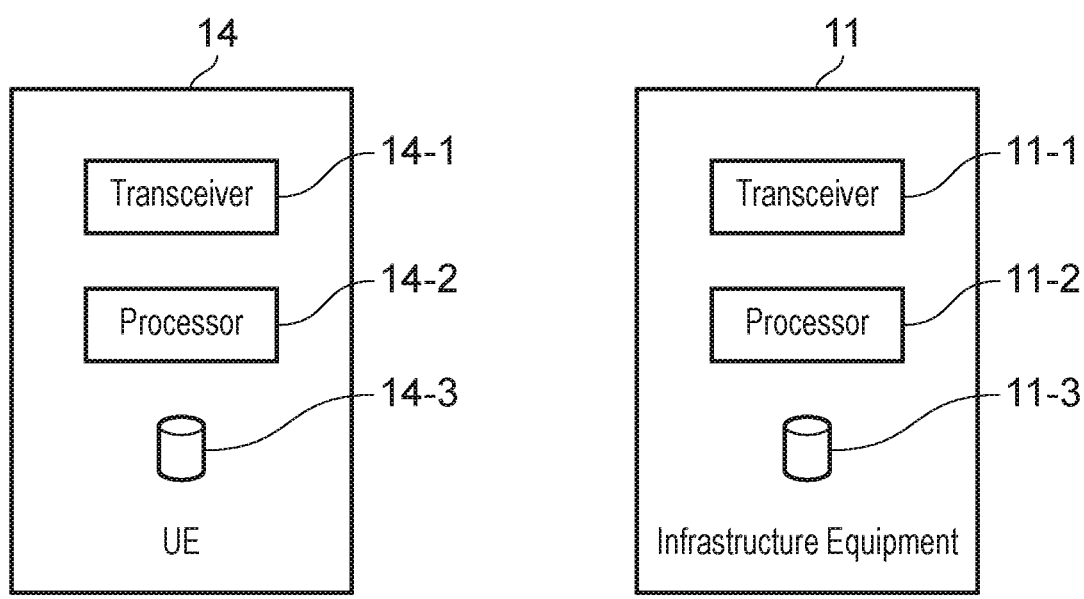
FIG. 3 shows schematically the terminal device 14 and infrastructure equipment 11 of FIG. 1.

FIG. 3 shows schematically the terminal device 14 and infrastructure equipment 11 of FIG. 1. The terminal device 14 includes a transceiver 14-1 which communicates with the infrastructure equipment 11 wirelessly. The transceiver 14-1 is controlled by processing circuitry 14-2 located within terminal device 14. The processing circuitry 14-2 may be embodied as any kind of circuitry such as an application specific integrated circuit or the like or may be a microprocessor. The processing circuitry 14-2 is itself controlled by software code which is stored on storage 14-3. The storage 14-3 is typically embodied as solid state circuitry designed to store program code.

Similarly, the infrastructure equipment 11 includes a transceiver 11-1 which communicates with the infrastructure equipment 11 wirelessly. The transceiver 14-1 is controlled by processing circuitry 14-2 located within infrastructure equipment 11. The processing circuitry 11-2 may be embodied as any kind of circuitry such as an application specific integrated circuit or the like or may be a microprocessor. The processing circuitry 11-2 is itself controlled by software code which is stored on storage 11-3. The storage 11-3 is typically embodied as solid state circuitry designed to store program code.

Figure 4:
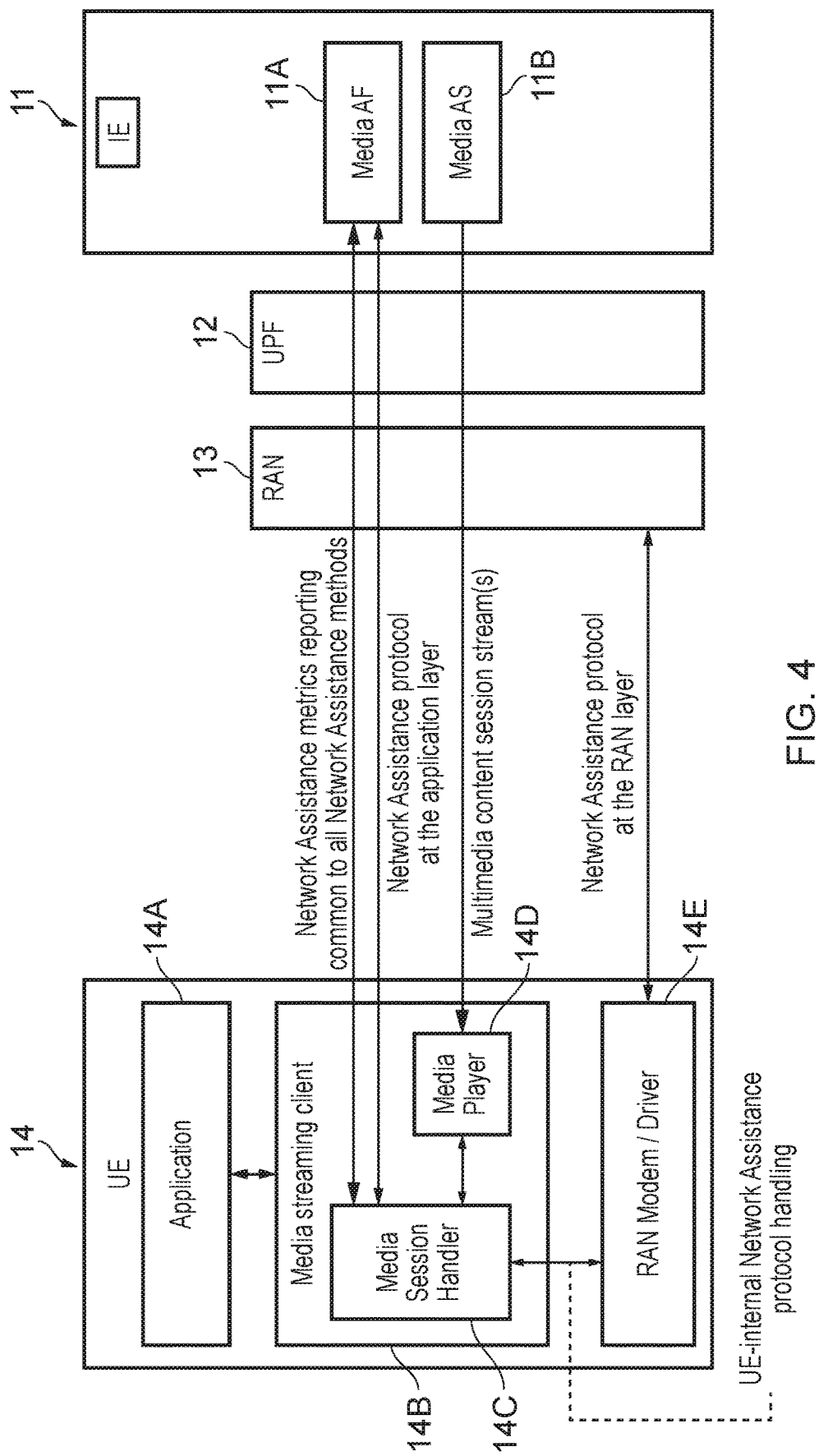
FIG. 4 schematically shows a media architecture according to embodiments of the disclosure.

FIG. 4 schematically shows a media architecture according to embodiments of the disclosure. The Application 14A and the Media Streaming Client 14B will be run on processing circuitry 14-2 within the terminal device 14. The Radio Access Network Modem/Driver 14E will be embodied on the transceiver 14-1. The 5GMS client receives a downlink media streaming service and provides an uplink Media Service that may be accessed through defined interfaces/Application Program Interfaces (APIs). The Media Streaming Client 14B contains two sub functions which will be run on processing circuitry 14-2 within the terminal device 14. The two sub-functions are a Media Session Handler 14C and a Media Player 14D. The Media Session Handler 14C is a function that establishes, controls and supports a media session within the terminal device 14 and communicates with a Media Application Function (Media AF) 11A running on the processing circuitry 11-2 within the infrastructure equipment 11. The Media AF 11A is similar to that defined in clause 6.2.10 of [2] and provides various control functions to the Media Session Handler 14C. The Media Player 14D is a function that streams the media content on the terminal device 14 and communicates with a Media Application Server (Media AS) 11B running on the processing circuitry 11-2 within the infrastructure equipment 11 and which hosts 5G media functions. It should be noted that, whilst the Media AF 11A and the Media AS 11B are shown to run on infrastructure equipment 11, this is for convenience and these are typically data network (DN) functions. Additionally shown are the User Plane Function 12 and the Radio Access Network 13. These are respective layers within the Infrastructure Equipment 11 as would be appreciated.

As noted in the introduction section, Network Assistance (NA) may be provided when the terminal device 14 streams media (such as audio and/or video) content. This media may be provided on either the uplink (i.e. terminal device 14 to infrastructure equipment 11) or the downlink (i.e. infrastructure equipment 11 to terminal device 14).

The NA function can be configured by the network via the provision of an NA server IP address, or some other unique identifier to enable the terminal device 14 to communicate with the NA server. This aspect is currently missing in [1]. (See [1] Clause 4.2.3 "Service Access Information" where a place holder for table is provided (Table 4.2.3-5 "Parameters for Network Assistance Configuration")).

As is commonly the case for other types of metrics reporting, the NA metrics reporting function can be configured to report at regular intervals, or at the end of each content streaming session. This configuration information can be common to some other, or all metrics reporting functions in the UE, depending on the system or service requirements.

Some realisations of a NA function do not require an identified NA server in the network, since they might perform the NA function by communicating with the RAN part of the network. In such cases the periodicity of metrics reporting may also be governed by rules and procedures around usage of the relevant RAN-layer protocols and procedures, hence this configuration information is also not required in that case.

The NA function has two components. The first is a recommendation component and the second is a boost component.

With the recommendation component, the User Equipment (UE) may ask the network for a recommendation of the best bitrate to use from amongst those offered by the media content server; for example, 500 kbps, 1 Mbps, 2 Mbps, 5 Mbps, 10 Mbps or the like. The network estimates the throughput of the data based on current load on the network and the current network conditions. The network then informs the UE. This enables the UE to make an informed choice of the bitrate to use rather than either starting with a very high bitrate and risking stalling or starting with a very low quality bitrate and gradually increasing it.

With the boost component, the reception of the bitstream may be interrupted, for example if reception is lost for a few seconds by passing through a tunnel or the like. This means that the media content buffer(s) may be depleted. By using the terminal device 14 can ask the network for a delivery boost to help it catch up and fill the depleted buffers to maintain the streaming content. If possible, the network will schedule a burst of packets to that terminal device 14. Specifically, a Network Assistance server (not shown) within the network would deliver both the recommendation component and the boost component as would be appreciated by the skilled person.

As will be apparent from FIG. 4, the NA may be provided over one of two layers within the system.

Firstly, the NA may be provided over the RAN layer. This is shown in FIG. 4 where the RAN modem/driver 14E is communicating with the RAN layer 13 within the network. In this case, the Media Session Handler 14C invokes the relevant procedure in the RAN Modem/Driver 14E.

Secondly, the NA may be provided over the application layer, as a part of the Media Session Handler protocols and processes. In this mechanism, the Media Session Handler 14C invokes the relevant application layer NA protocol that communicates with the Media AF 11A.

These two different mechanisms for providing NA require NA metrics to be reported. These have yet to be defined and it is desirable that the same NA metrics are produced regardless of the mechanism over which NA is delivered. In other words, it is desirable that the same NA metrics information is provided regardless of whether the NA is delivered over the RAN layer or application layer. As will be appreciated, where we refer to the application layer, this may include, or be the application layer protocol.

It is envisaged that the NA metrics reporting function will be included in the Media Session Handler 14C and will be provided over the application layer as part of the Media Session Handler procedures and protocols.

This is because when a media session for playback or delivery of media content to or from the DN is commenced, the Media Session Handler 14C starts this. Therefore, when the media session is commenced, the Media Session Handler may perform the recommendation component of the NA by contacting the NA server via the Media AF 11A. Moreover, during playback or transmission of the streaming media content, the Media Player 14D notifies the Media Session Handler 14C when the media content buffers risk underflow and thus causing the streaming of the media content to stall. The Media Session Handler 14C requests a boost component of NA from the NA server within the network.

Accordingly, by inclusion of the NA metrics in the Media Session Handler 14C, implementation of the NA metrics reporting is more efficient.

In embodiments the NA metrics will be provided periodically by the terminal device 14. In embodiments, the NA metrics relate or are associated to one or more previous set of NA metrics. These may be provided in a batch mode or a periodic mode. The NA metrics may be provided every predefined period of time. The NA metrics will typically be provided as required by the network. This predefined period of time may be defined as a predetermined period of time (for example, every 5 seconds) or may be after an event such as at the end of a media session. The NA metrics will report for that predefined period of time. In other words, the NA metrics will report a bitrate recommendation metric that defines the number of bitrate recommendations in the predefined period of time and a boost metric that defines the number of delivery boosts in the predefined period of time. The NA metrics may be reported until the network requests to stop the delivery of the NA metrics.

It is envisaged that the NA metrics are provided with other consumption metrics. However, the disclosure is not so limited and the NA metrics may be provided separately to consumption metrics. The predefined period of time may also be the same as for the consumption metrics. This is defined in section 5.6 of [1]. Specifically, these consumption metrics include (but are not limited to) Report interval, Server Address, Location Reporting, Media Player Entry Pointer, Consumption Reporting Client ID, Location Type, Location, Media Consumed, Start Time and Duration as would be appreciated.

As noted above, the NA metrics provide a bitrate recommendation and a boost metric. The bitrate recommendation metric defines the number of bitrate recommendations in the predefined period of time and the boost metric defines the number of delivery boosts in the predefined period of time.

In addition, a server identifier that identifies the Network Assistance server is provided in the NA metrics. This identifier may be the IP address of the server or any kind of identifier that uniquely identifies the NA server. This information is provided since NA metrics reporting may be sent to a metrics server that is not the same entity as the NA server.

The bitrate recommendation metric, in embodiments, includes one or more of the number of times the terminal device has requested a bitrate recommendation in the predefined period of time; and the number of times the Network Assistance server has provided a bitrate recommendation to the terminal device in the predefined period of time.

The boost metric, in embodiments, includes one or more of the number of times the terminal device has requested a delivery boost in the predefined period of time; and the number of times the Network Assistance server has provided a delivery boost to the terminal device in the predefined period of time.

The following table (table 1) provides the parameters for NA metric reporting. Of course, additional parameters or the same parameters with different names may be provided.

TABLE 1

| Parameters | Description |
| --- | --- |
| Server address | IP address or other identifier of the NA server. |
| Number of recommendations requested | The count of the number of times the UE requested a bitrate recommendation in the relevant period. If the NA protocol variant used to which the NA metrics applies does not rely on the UE issuing explicit requests for bitrate recommendations, rather the nature of the protocol is that the network sends recommendations at its own discretion, then this value would be zero if no explicit requests are sent by the UE. |
| Number of recommendations served or provided | The count of the number of times the NA server provided a bitrate recommendation back to the UE in the relevant period. This number will usually be less than or equal to the number of bitrate recommendation requests. This count is not incremented if some error occurred that resulted in either no response or a response that did not provide an actual recommendation. For an NA protocol that does not rely on explicit bitrate recommendation requests from the UE, this value could be the actual number of times the network sent a recommendation. |
| Number of boost requests | The count of the number of times the UE requested a delivery boost in the relevant period. |
| Number of boost requests served | The count of the number of times the NA server provided a delivery boost to the UE in the relevant period. This number will always be less than or equal to the number of delivery boost requests. This count is not incremented if some error occurred, as well as when the network declined to provide the delivery boost. |

Of course, although Table 1 describes a non-exhaustive list of parameters that may be provided, a selection of the above parameters may be provided. For example, the network may only require the number of boost requests served to be provided. This may be done in the event that the network is interested in the performance of the NA server at providing the delivery boost. Of course, this is only exemplary and any one of the parameters provided in Table 1 may be provided on its own or in any combination with any of the other parameters noted in Table 1.

NA reporting, according to embodiments of the disclosure, will now be described. In Clause 10.6 of [4], a "Quality Reporting Protocol" is specified. More specifically, in Clause 10.6.2, an XML Schema specification for the report format is provided. The report format allows additional supplemental Quality of Experience (QoE) metrics to be carried via a schema extension.

At present one type of extension is defined; namely "DeviceInformationType". In order to carry NA metric metrics information, a new additional supplemental QoE metric type is defined, which may be named, for example, the "NetworkAssistanceEntryType". The "NetworkAssistanceEntryType" is defined as a complex typecarrying the NA metrics parameters mentioned above. The new "SupplementQoEMetric" noted in [4] may therefore include the new "NetworkAssistanceEntryType" as shown below in the schema of Table 2.

In this example, the URN namespace "urn:3gpp:metadata:2020:PSS:SupplementQoEMetric" represents a revision of the same namespace defined in the current version of TS 26.247, namely "urn:3gpp:metadata:2016:PSS:SupplementQoEMetric".

Obviously, some or all of the elements of the new type may have different names, or some parameters may be omitted. The latter possibility may be the case in particular for the network assistance server address element. In the schema definition in Table 2 it is defined as an optional element. In some embodiments it may be preferable not to include the server address information in the NA metrics reports.

In embodiments it is expected that NA metrics reports will be sent independently of, and separately from QoE reports that pertain to a content streaming session, which is the primary application of the QoE metrics schema defined in [4]. However, there is a provision to send only supplemental QoE metric(s) without regular QoE metrics by filling the Media Presentation Description (MPD) information with dummy data, as stated in the note at the end of clause 10.6.2 of [4].

The schema extension for NetworkAssistanceEntryType can also serve as a component of any schema defined for the purpose of metrics reporting, and in particular for NA metrics reporting. For example, a dedicated NA metrics reporting XML schema may be defined to carry only NA metrics information.

Figure 5A:
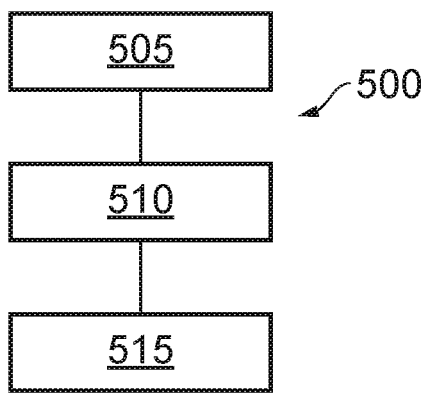
FIGS. 5A and 5B show a process carried out in the terminal device 14 and the infrastructure equipment 11 respectively.
Figure 5B:
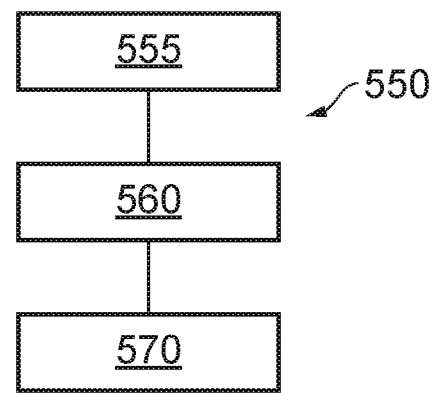

FIG. 5A shows a flow chart of a process at the terminal device 14 and FIG. 5B shows a flow chart of a process at the infrastructure 11.

Referring to FIG. 5A, the process 500 starts at step 505. The process moves to step 510 where processing circuitry 14-2 is configured to control the transceiver circuitry 14-1 to: provide Network Assistance metric parameters, the Network Assistance metric parameters including: a server identifier that identifies the Network Assistance server; a bitrate recommendation metric that defines the number of bitrate recommendations in a predefined period of time and a boost metric that defines the number of delivery boosts in the predefined period of time. The Network Assistance Metric parameters may be provided over the Application Layer.

The process 500 then moves to step 515 where the process ends.

Referring to FIG. 5B, the process 550 starts at step 555. The process moves to step 560 where processing circuitry 11-2 is configured to control the transceiver circuitry 11-1 to: receive Network Assistance metric parameters, the Network Assistance metric parameters including: a server identifier that identifies the Network Assistance server; a bitrate

TABLE 2

SupplementQoEMetric Schema Definition

```
<?xml version="1.0" encoding="UTF-8"?>
<xs:schema
  xmlns="urn:3gpp:metadata:2016:PSS:SupplementQoEMetric"
  xmlns:xs="http://www.w3.org/2001/XMLSchema"
  targetNamespace="urn:3gpp:metadata:2020:PSS:SupplementQoEMetric"
  elementFormDefault="qualified">
  <xs:element name="supplementQoEMetric" type="SupplementQoEMetricType"/>
  <xs:complexType name="SupplementQoEMetricType">
    <xs:sequence>
      <xs:element name="deviceinformation" type="DeviceInformationType" minOccurs="0"/>
      <xs:element name="networkAssistance" type="NetworkAssistanceType" minOccurs="0"/>
      <xs:any namespace="##other" processContents="lax" minOccurs="0"
maxOccurs="unbounded"/>
    </xs:sequence>
  </xs:complexType>
  <xs:complexType name="DeviceInformationType">
    <xs:choice>
      <xs:element name="Entry" type="DeviceInformationEntryType" maxOccurs="unbounded"/>
    </xs:choice>
    <xs:anyAttribute processContents="skip"/>
  </xs:complexType>
  <xs:complexType name="NetworkAssistanceType">
    <xs:choice>
      <xs:element name="Entry" type="NetworkAssistanceEntryType" maxOccurs="unbounded"/>
    </xs:choice>
    <xs:anyAttribute processContents="skip"/>
  </xs:complexType>
  <xs:complexType name="DeviceInformationEntryType">
    <xs:attribute name="start" type="xs:dateTime" use="required"/>
    <xs:attribute name="mstart" type="xs:duration" use="required"/>
    <xs:attribute name="videoWidth" type="xs:unsignedInt" use="required"/>
    <xs:attribute name="videoHeight" type="xs:unsignedInt" use="required"/>
    <xs:attribute name="screenWidth" type="xs:unsignedInt" use="required"/>
    <xs:attribute name="screenHeight" type="xs:unsignedInt" use="required"/>
    <xs:attribute name="pixelWidth" type="xs:double" use="required"/>
    <xs:attribute name="pixelHeight" type="xs:double" use="required"/>
    <xs:attribute name="fieldOfView" type="xs:double" use="required"/>
    <xs:anyAttribute processContents="skip"/>
  </xs:complexType>
  <xs:complexType name="NetworkAssistanceEntryType">
    <xs:attribute name="serverAddress" type="xs:string" use="optional"/>
    <xs:attribute name="recommendationsRequested" type="xs:unsignedInt" use="required"/>
    <xs:attribute name="recommendationsProvided" type="xs:unsignedInt" use="required"/>
    <xs:attribute name="boostsRequested" type="xs:unsignedInt" use="required"/>
    <xs:attribute name="boostsGranted" type="xs:unsignedInt" use="required"/>
    <xs:anyAttribute processContents="skip"/>
  </xs:complexType>
</xs:schema>
``` recommendation metric that defines the number of bitrate recommendations in a predefined period of time and a boost metric that defines the number of delivery boosts in the predefined period of time. The Network Assistance Metrics parameters may be provided over the Application Layer.

The process 550 then moves to step 570 where the process 550 ends.

Those skilled in the art would appreciate that the method shown by FIGS. 7A and 7B may be adapted in accordance with embodiments of the present technique. For example, other preliminary, intermediate, or subsequent steps as described herein may be included in the method, or the steps may be performed in any logical order.

Though embodiments of the present technique have been described largely by way of the example communications system shown in FIG. 6, it would be clear to those skilled in the art that they could be equally applied to other systems to those described herein. Furthermore, to the extent that the various arrangements described herein are described individually, these can be combined with any other arrangement described herein providing the two do not contradict one another.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

1. A terminal device comprising:
   transceiver circuitry configured to communicate with infrastructure equipment; and
   processing circuitry configured to control the transceiver circuitry to:
   provide Network Assistance metrics information, the Network Assistance metrics information including: a server identifier that identifies the Network Assistance server; a bitrate recommendation metric that defines the number of bitrate recommendations in a predefined period of time and a boost metric that defines the number of delivery boosts in the predefined period of time.

2. A terminal device according to clause 1, wherein the bitrate recommendation metric includes one or more of the number of times the terminal device has requested a bitrate recommendation in the predefined period of time; and the number of times the Network Assistance server has provided a bitrate recommendation to the terminal device in the predefined period of time.

3. A terminal device according to clause 1 or 2, wherein the boost metric includes one or more of the number of times the terminal device has requested a delivery boost in the predefined period of time; and the number of times the Network Assistance server has provided a delivery boost to the terminal device in the predefined period of time.

4. A terminal device according to any preceding clause, wherein the bitrate recommendation metric and the boost metric are provided every predetermined period of time or at the end of a Media session.

5. A terminal device according to any preceding clause, wherein the bitrate recommendation metric and the boost metric are provided with at least one consumption metric.

6. A terminal device according to any preceding clause, wherein the Network Assistance metrics information is provided via signaling in an application layer.

7. A terminal device according to any preceding clause, wherein the Network Assistance metrics information is provided when the Network Assistance is provided on the Radio Access Network layer or the Application Layer.

8. Infrastructure Equipment comprising:
   transceiver circuitry configured to communicate with a terminal device; and
   processing circuitry configured to control the transceiver circuitry to:
   receive Network Assistance metrics information, the Network Assistance metrics information including: a server identifier that identifies the Network Assistance server; a bitrate recommendation metric that defines the number of bitrate recommendations in a predefined period of time and a boost metric that defines the number of delivery boosts in the predefined period of time.

9. Infrastructure Equipment according to clause 8, wherein the bitrate recommendation metric includes one or more of the number of times the terminal device has requested a bitrate recommendation in the predefined period of time; and the number of times the Network Assistance server has provided a bitrate recommendation to the terminal device in the predefined period of time.

10. Infrastructure Equipment according to clause 8 or 9, wherein the boost metric includes one or more of the number of times the terminal device has requested a delivery boost in the predefined period of time; and the number of times the Network Assistance server has provided a delivery boost to the terminal device in the predefined period of time.

11. Infrastructure Equipment according to any one of clause 8 to 10, wherein the bitrate recommendation metric and the boost metric are received every predetermined period of time or at the end of a Media session.

12. Infrastructure Equipment according to any one of clause 8 to 11, wherein the bitrate recommendation metric and the boost metric are received with at least one consumption metric.

13. Infrastructure Equipment according to any one of clause 8 to 12, wherein the Network Assistance metric is provided via signaling in an application layer.

14. Infrastructure Equipment according to any one of clause 8 to 13, wherein the Network Assistance metric is provided when the Network Assistance is provided on the Radio Access Network layer or the Application Layer.

15. A method of operating a terminal device comprising the steps of:
   providing, to Infrastructure Equipment, Network Assistance metrics information , the Network Assistance metric information including: a server identifier that identifies the Network Assistance server;
   a bitrate recommendation metric that defines the number of bitrate recommendations in a predefined period of time and a boost metric that defines the number of delivery boosts in the predefined period of time.

16. A method according to clause 15, wherein the bitrate recommendation metric includes one or more of the number of times the terminal device has requested a bitrate recommendation in the predefined period of time; and the number of times the Network Assistance server has provided a bitrate recommendation to the terminal device in the predefined period of time.

17. A method according to clause 15 or 16, wherein the boost metric includes one or more of the number of times the terminal device has requested a delivery boost in the predefined period of time; and the number of times the Network Assistance server has provided a delivery boost to the terminal device in the predefined period of time.

18. A method according to any one of clause 15 to 17, wherein the bitrate recommendation metric and the boost metric are provided every predetermined period of time or at the end of a Media session.

19. A method according to any one of clause 15 to 18, wherein the bitrate recommendation metric and the boost metric are provided with at least one consumption metric.

20. A method according to any one of clause 15 to 19, wherein the Network Assistance metric information is provided via signaling in an application layer.

21. A method according to any one of clause 15 to 20, wherein the Network Assistance metric information is provided when the Network Assistance is provided on the Radio Access Network layer or the Application Layer.

22. A method of operating Infrastructure Equipment comprising:
receiving, from a terminal device, Network Assistance metric information, the Network Assistance metric information including: a server identifier that identifies the Network Assistance server;
a bitrate recommendation metric that defines the number of bitrate recommendations in a predefined period of time and a boost metric that defines the number of delivery boosts in the predefined period of time.

23. A method according to clause 22, wherein the bitrate recommendation metric includes one or more of the number of times the terminal device has requested a bitrate recommendation in the predefined period of time; and the number of times the Network Assistance server has provided a bitrate recommendation to the terminal device in the predefined period of time.

24. A method according to clause 22 or 23, wherein the boost metric includes one or more of the number of times the terminal device has requested a delivery boost in the predefined period of time; and the number of times the Network Assistance server has provided a delivery boost to the terminal device in the predefined period of time.

25. A method according to any one of clause 22 to 24, wherein the bitrate recommendation metric and the boost metric are received every predetermined period of time or at the end of a Media session.

26. A method according to any one of clause 22 to 25, wherein the bitrate recommendation metric and the boost metric are received with at least one consumption metric.

27. A method according to any one of clause 22 to 26, wherein the Network Assistance metric information is provided via signaling in an application layer.

28. A method according to any one of clause 22 to 27, wherein the Network Assistance metric information is provided when the Network Assistance is provided on the Radio Access Network layer or the Application Layer.

29. A computer program comprising computer readable code, which, when loaded onto a computer configures the computer to perform a method according to any one of clause 15 to 29.

30. A terminal device comprising:
transceiver circuitry configured to communicate with infrastructure equipment; and
processing circuitry configured to control the transceiver circuitry to:
receive a unique identifier of a Network Assistance server from the infrastructure equipment; and the processing circuitry is configured to configure a Network Assistance function using the received unique identifier.

31. Infrastructure equipment comprising:
transceiver circuitry configured to communicate with a terminal device; and
processing circuitry configured to control the transceiver circuitry to:
transmit a unique identifier of a Network Assistance server to the terminal device; and the processing circuitry is configure to configure a Network Assistance function using the received unique identifier.

32. A method performed on a terminal device comprising:
receiving a unique identifier of a Network Assistance server from the infrastructure equipment; and configuring a Network Assistance function using the received unique identifier.

33. A method performed on infrastructure equipment comprising:
transmitting a unique identifier of a Network Assistance server to the terminal device; and configuring a Network Assistance function using the received unique identifier.

34. A computer program comprising computer readable code, which, when loaded onto a computer configures the computer to perform a method according to any one of clause 32 or 33.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] 3GPP TS 26.501 V16.3.0 "5G Media Streaming (5GMS) General Description and Architecture"

[2] 3GPP TS 23.501 V16.4.0 "System Architecture for the 5G System"

[3] Holma H. and Toskala A, "LTE for UMTS OFDMA and SC-FDMA based radio access", John Wiley and Sons, 2009.

[4] 3GPP TS 26.247 V16.4.1 "Transparent end-to-end Packet-switched Streaming Service (PSS); Progressive Download and Dynamic Adaptive Streaming over HTTP (3GP-DASH)"

What is claimed is:
1. A terminal device comprising:
transceiver circuitry configured to communicate with infrastructure equipment; and
processing circuitry configured to control the transceiver circuitry to:

provide Network Assistance metrics information, the Network Assistance metrics information including: a bitrate recommendation metric that defines the number of bitrate recommendations in a predefined period of time and/or a boost metric that defines the number of delivery boosts in the predefined period of time.

2. The terminal device according to claim 1, wherein the bitrate recommendation metric includes one or more of the number of times the terminal device has requested a bitrate recommendation in the predefined period of time and/or the number of times the Network Assistance server has provided a bitrate recommendation to the terminal device in the predefined period of time.

3. The terminal device according to claim 1, wherein the boost metric includes one or more of the number of times the terminal device has requested a delivery boost in the predefined period of time and/or the number of times the Network Assistance server has provided a delivery boost to the terminal device in the predefined period of time.

4. The terminal device according to claim 1, wherein the bitrate recommendation metric and the boost metric are provided every predetermined period of time or at the end of a Media session.

5. The terminal device according to claim 1, wherein the bitrate recommendation metric and the boost metric are provided with at least one consumption metric.

6. The terminal device according to claim 1, wherein the Network Assistance metrics information is provided via signalling in an application layer.

7. The terminal device according to claim 1, wherein the Network Assistance metrics information is provided when the Network Assistance is provided on the Radio Access Network layer or the Application Layer.

8. An Infrastructure Equipment comprising:
transceiver circuitry configured to communicate with a terminal device; and
processing circuitry configured to control the transceiver circuitry to:
receive Network Assistance metrics information, the Network Assistance metrics information including: a bitrate recommendation metric that defines the number of bitrate recommendations in a predefined period of time and/or a boost metric that defines the number of delivery boosts in the predefined period of time.

9. The Infrastructure Equipment according to claim 8, wherein the bitrate recommendation metric includes one or more of the number of times the terminal device has requested a bitrate recommendation in the predefined period of time and/or the number of times the Network Assistance server has provided a bitrate recommendation to the terminal device in the predefined period of time.

10. The Infrastructure Equipment according to claim 8, wherein the boost metric includes one or more of the number of times the terminal device has requested a delivery boost in the predefined period of time and/or the number of times the Network Assistance server has provided a delivery boost to the terminal device in the predefined period of time.

11. The Infrastructure Equipment according to claim 8, wherein the bitrate recommendation metric and the boost metric are received every predetermined period of time or at the end of a Media session.

12. The Infrastructure Equipment according to claim 8, wherein the bitrate recommendation metric and the boost metric are received with at least one consumption metric.

13. The Infrastructure Equipment according to claim 8, wherein the Network Assistance metric is provided via signalling in an application layer.

14. The Infrastructure Equipment according to claim 8, wherein the Network Assistance metric is provided when the Network Assistance is provided on the Radio Access Network layer or the Application Layer.

15. A method of operating a terminal device comprising the steps of:
providing, to Infrastructure Equipment, Network Assistance metrics information, the Network Assistance metric information including a bitrate recommendation metric that defines the number of bitrate recommendations in a predefined period of time and/or a boost metric that defines the number of delivery boosts in the predefined period of time.

16. The method according to claim 15, wherein the bitrate recommendation metric includes one or more of the number of times the terminal device has requested a bitrate recommendation in the predefined period of time and/or the number of times the Network Assistance server has provided a bitrate recommendation to the terminal device in the predefined period of time.

17. The method according to claim 15, wherein the boost metric includes one or more of the number of times the terminal device has requested a delivery boost in the predefined period of time and/or the number of times the Network Assistance server has provided a delivery boost to the terminal device in the predefined period of time.

18. The method according to claim 15, wherein the bitrate recommendation metric and the boost metric are provided every predetermined period of time or at the end of a Media session.

19. A method of operating Infrastructure Equipment comprising:
receiving, from a terminal device, Network Assistance metric information, the Network Assistance metric information including: a bitrate recommendation metric that defines the number of bitrate recommendations in a predefined period of time and/or a boost metric that defines the number of delivery boosts in the predefined period of time.

20. A terminal device comprising:
transceiver circuitry configured to communicate with infrastructure equipment; and
processing circuitry configured to control the transceiver circuitry to:
receive a unique identifier of a Network Assistance server from the infrastructure equipment; and the processing circuitry is configured to configure a Network Assistance function using the received unique identifier;
wherein the Network Assistance function provides Network Assistance metrics information, the Network Assistance metrics information including: a bitrate recommendation metric that defines the number of bitrate recommendations in a predefined period of time and/or a boost metric that defines the number of delivery boosts in the predefined period of time.

* * * * *